United States Patent
Fujiwara

(10) Patent No.: US 8,717,453 B2
(45) Date of Patent: May 6, 2014

(54) VIDEO PROCESSING APPARATUS, AND CONTROL METHOD AND PROGRAM THEREFOR

(75) Inventor: Masato Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 12/757,496

(22) Filed: Apr. 9, 2010

(65) Prior Publication Data

US 2010/0289913 A1 Nov. 18, 2010

(30) Foreign Application Priority Data

May 13, 2009 (JP) .................................. 2009-117045

(51) Int. Cl.
*H04N 5/228* (2006.01)

(52) U.S. Cl.
USPC ...................................................... 348/222.1

(58) Field of Classification Search
None
See application file for complete search history.

(56) References Cited

U.S. PATENT DOCUMENTS

| | | | | |
|---|---|---|---|---|
| 6,144,755 A * | 11/2000 | Niyogi et al. | ................. | 382/118 |
| 7,209,149 B2 * | 4/2007 | Jogo | ............................. | 345/622 |
| 7,432,983 B2 | 10/2008 | Masukura et al. | | |
| 2002/0089516 A1 * | 7/2002 | Sobol | ............................ | 345/620 |
| 2011/0044512 A1 * | 2/2011 | Bambha et al. | ............... | 382/118 |

FOREIGN PATENT DOCUMENTS

| | | |
|---|---|---|
| JP | 3793142 | 7/2006 |
| JP | 2006-309661 | 11/2006 |

* cited by examiner

*Primary Examiner* — Luong T Nguyen
(74) *Attorney, Agent, or Firm* — Cowan, Liebowitz & Latman, P.C.

(57) ABSTRACT

An image processing apparatus for cropping and outputting a plurality of partial images from an image, includes: an acquisition unit adapted to acquire object areas for a plurality of objects included in an image to be processed; an analysis unit adapted to analyze a distribution of the acquired object areas; a determination unit adapted to determine a cropping scheme for cropping partial images from the image to be processed, based on the distribution of the object areas; and a cropping unit adapted to crop the partial images from the image to be processed, using the determined cropping scheme.

12 Claims, 14 Drawing Sheets

FIG. 5A
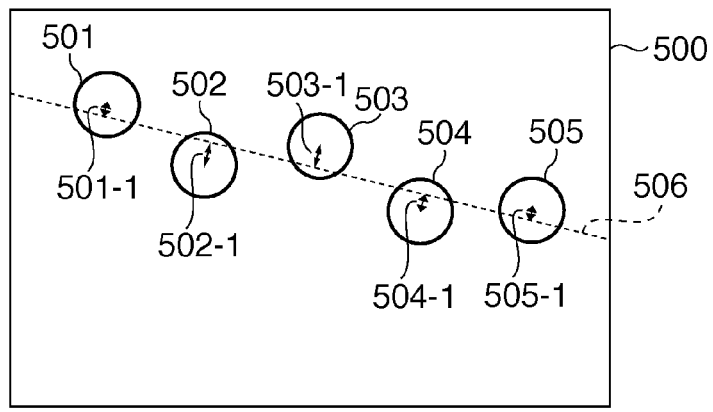
FIG. 5B  FIG. 5C  FIG. 5D
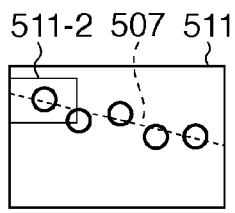 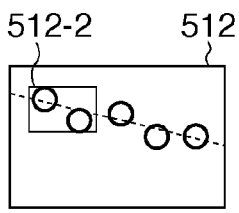 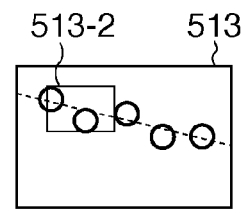
FIG. 5E  FIG. 5F  FIG. 5G
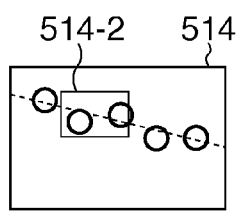 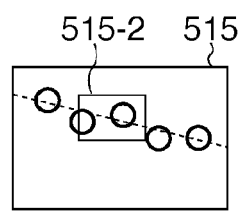 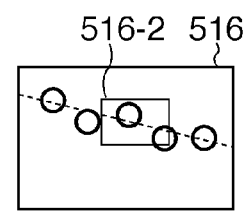
FIG. 5H  FIG. 5I  FIG. 5J
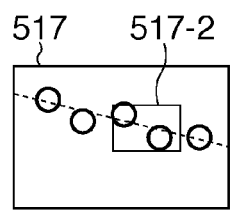 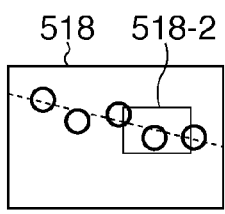 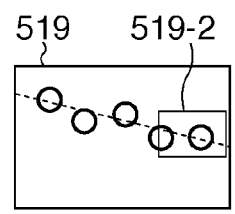

FIG. 9A
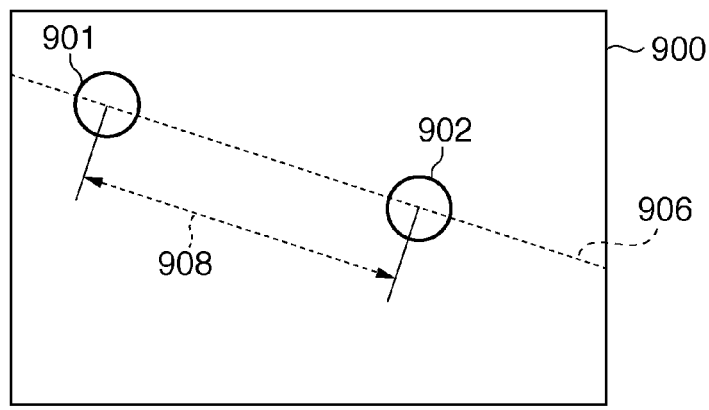
FIG. 9B  FIG. 9C  FIG. 9D
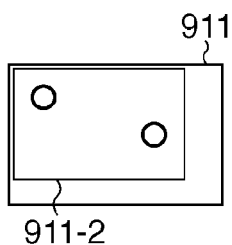 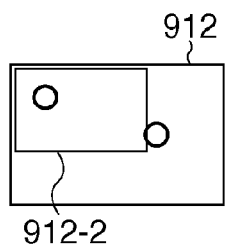 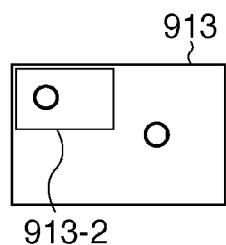
FIG. 9E  FIG. 9F  FIG. 9G
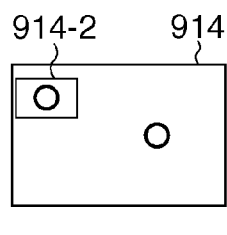 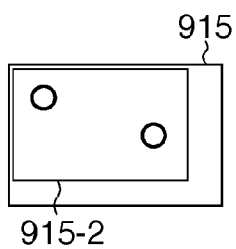 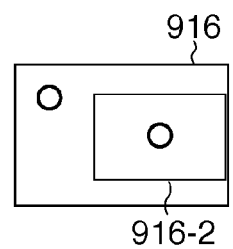
FIG. 9H  FIG. 9I
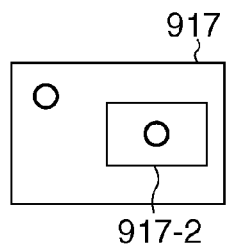 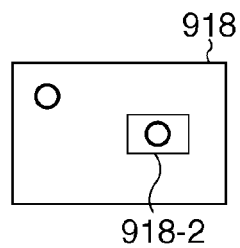

F I G. 11
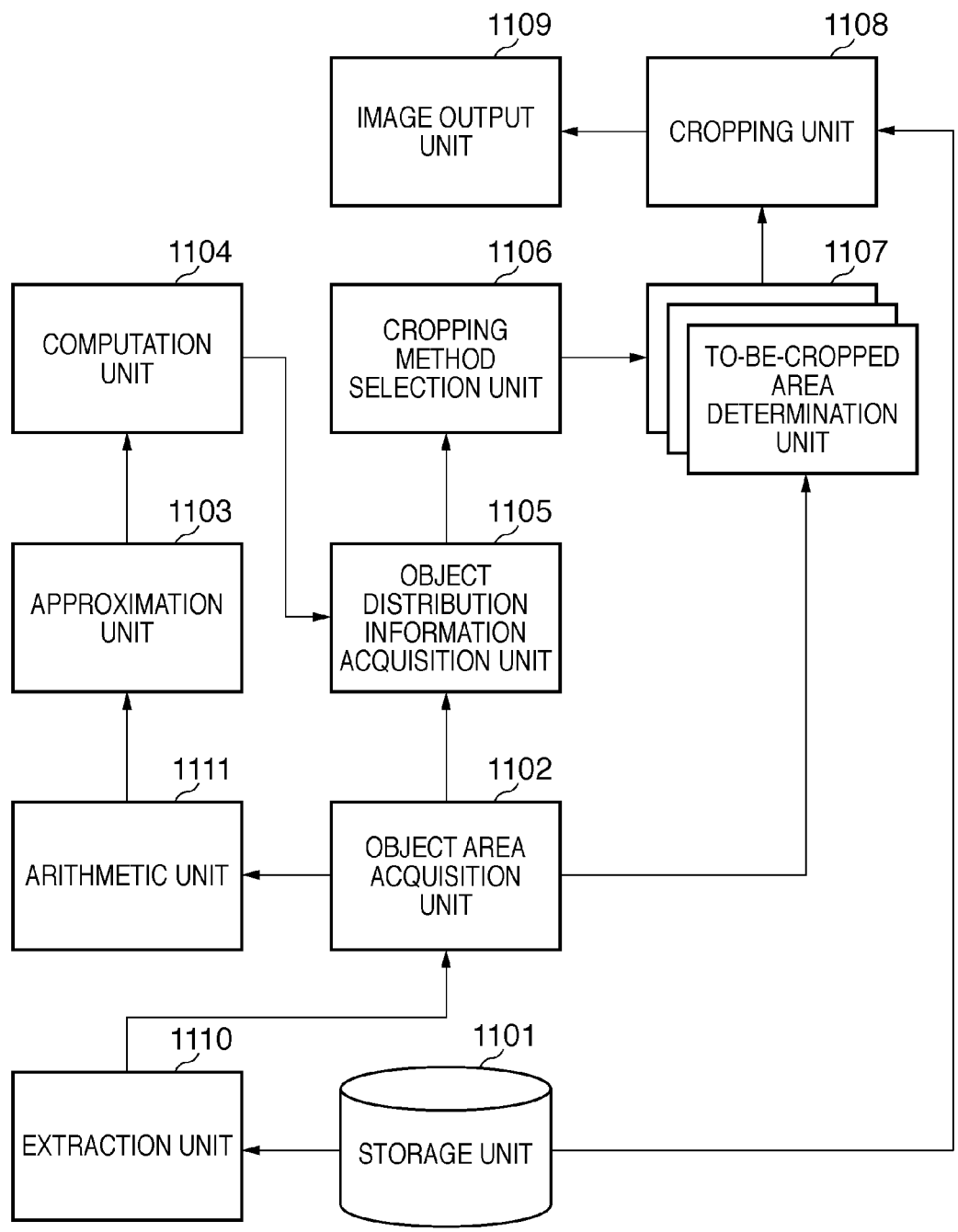

VIDEO PROCESSING APPARATUS, AND CONTROL METHOD AND PROGRAM THEREFOR

BACKGROUND OF THE INVENTION

1. Field of the Invention

The present invention relates to a video processing technique, and in particular to a technique for automatically assigning virtual camera operations to video.

2. Description of the Related Art

The recent ubiquity of digital still cameras and digital video camcorders has made frequent opportunities for still-image and video capturing. In addition, increasing storage capacity has increased the number of contents therein dramatically. Meanwhile, such contents have been viewed by reproducing and displaying a slide show or images in full screen on a display apparatus.

With the increase in the number of contents, there is a strong need for a viewing environment that enables automatic editing of output video. Thus, recently, some slide shows have started to use display effects obtained by cropping multiple parts of an image and displaying the cropped parts as video in cropped order so that a still image is viewed like a live-action moving image.

However, many of such display effects are uniform and have not yet satisfied many viewers. Also, the editing of a moving image requires special skills and takes a long time. There is also an editing system that is known to automatically determine areas to be cropped for each frame in a moving image and reproduce video with more dramatic video effects, but in fact, such editing is in many cases not performed as viewers would have desired. In particular, as for a section of video that is almost unchanged, there is little information that can be used as a guide for editing, so viewers are restricted to view monotonous images.

For example, in the configuration described in Japanese Patent No. 03793142, for the editing of assigning a virtual camera operation by cropping area spaces in accumulated video, areas to be cropped are determined by setting restrictions such as not being allowed to go out of frame, having a specified resolution or higher, and being allowed to move at a speed only within a specified range. Areas to be cropped are determined by using image feature quantity, sound feature quantity, and any other metadata on video reproduction or distribution. In particular, an area where an object exists is used as the image feature quantity.

Meanwhile, Japanese Patent Laid-Open No. 2006-309661 describes a configuration in which the number of subjects and the sizes of people's faces are identified in a still-image slide show, and if the number of subjects is larger than a threshold, multiple areas are cropped and output so as to include not more than an arbitrary number of subjects.

However, in the configuration described in Japanese Patent No. 03793142, depending on the contents of video, in particular in such a case where subjects remain almost stationary, the same area spaces are cropped, and monotonous video reproduction is forcefully issued accordingly. Also, in Japanese Patent Laid-Open No. 2006-309661, not only cannot a natural camera operation such as zooming, panning, or tilting be expected, but also image continuity is degraded. For example, if the display technique described in Japanese Patent Laid-Open No. 2006-309661 is applied to an image in which subjects are aligned, it is difficult to grasp the relationship of the order of the subjects from a displayed image.

SUMMARY OF THE INVENTION

The present invention has been made in view of the above-described problems, and aims to provide a technique for cropping partial images from an image to be processed and implementing a virtual camera operation properly to match the nature of the image.

According to one aspect of the present invention, an image processing apparatus for cropping and outputting a plurality of partial images from an image, includes:

an acquisition unit adapted to acquire object areas for a plurality of objects included in an image to be processed;

an analysis unit adapted to analyze a distribution of the acquired object areas;

a determination unit adapted to determine a cropping scheme for cropping partial images from the image to be processed, based on the distribution of the object areas; and a cropping unit adapted to crop the partial images from the image to be processed, using the determined cropping scheme.

According to another aspect of the present invention, a method for controlling an image processing apparatus that crops and outputs a plurality of partial images from an image, includes:

an acquisition step of acquiring object areas for a plurality of objects included in an image to be processed;

an analysis step of analyzing a distribution of the acquired object areas;

a determination step of determining a cropping scheme for cropping the partial images from the image to be processed, based on the distribution of the object areas; and a cropping step of cropping the partial images from the image to be processed, using the determined cropping scheme.

Further features of the present invention will become apparent from the following description of exemplary embodiments (with reference to the attached drawings).

BRIEF DESCRIPTION OF THE DRAWINGS

FIGS. 5A, 5B, 5C, 5D, 5E, 5F, 5G, 5H, 5I, and 5J are schematic diagrams illustrating an example of a virtual camera operation.

FIGS. 9A, 9B, 9C, 9D, 9E, 9F, 9G, 9H, and 9I are schematic diagrams illustrating an example of a virtual camera operation.

FIG. 11 is a block diagram illustrating an example of a functional configuration of another video processing apparatus.

DESCRIPTION OF THE EMBODIMENTS

First Embodiment

Hardware Configuration of Video Processing Apparatus

First, a hardware configuration of a video processing apparatus (image processing apparatus) according to the present embodiment will be described with reference to FIG. 14, which illustrates an example of the hardware configuration of the video processing apparatus. Note that the video processing apparatus according to the present embodiment is achieved by a personal computer (PC), a workstation (WS), or a personal digital assistant (PDA), for example.

Figure 14:
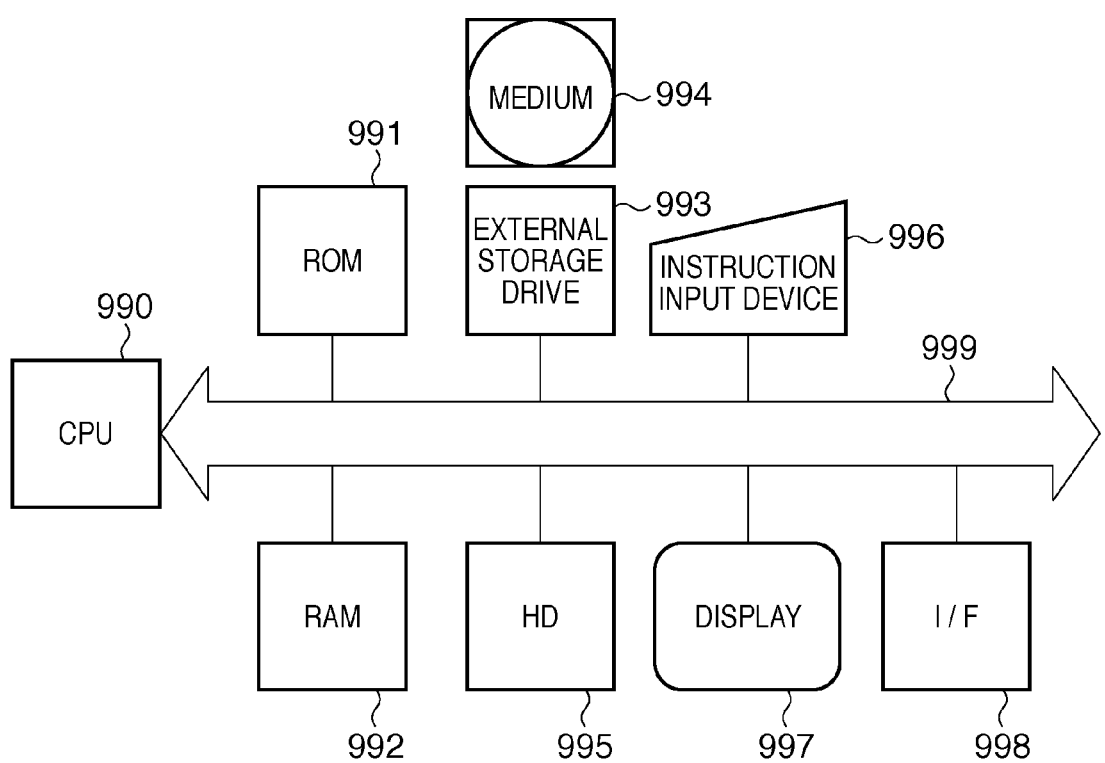
FIG. 14 is a block diagram illustrating an example of a hardware configuration of the video processing apparatus.

In FIG. 14, the reference numeral 990 denotes a CPU. The CPU 990 executes an application program (AP), an operating system (OS), a control program, and the like that are stored in a hard disk apparatus 995, and takes control of temporarily storing information, files, and the like that are necessary for program execution into a RAM 992.

The reference numeral 991 denotes a ROM that stores therein various data such as programs including a basic I/O program, font data used in basic processing, and template data. The reference numeral 992 denotes a RAM that temporarily stores various data and serves as a main memory, a work area, or the like of the CPU 990.

The reference numeral 993 denotes an external storage drive that provides access to a recording medium, and it enables a program or the like stored in a medium (recording medium) 994 to be loaded into the computer system according to the present invention. Note that examples of the medium 994 include a flexible disk (FD), a CD-ROM, a DVD, a USB memory, an MO, a flash memory, for example.

The reference numeral 995 denotes an external storage unit, and in the present embodiment, a hard disk apparatus (hereinafter referred to as the "HD") is used that serves as a bulk memory. The HD 995 stores an application program (AP), an OS, a control program, a relevant program, and so on.

The reference numeral 996 denotes an instruction input device that is equivalent to a keyboard, a pointing device (such as a mouse), a touch panel, or the like. With the instruction input device 996, a user inputs a command that instructs to control the video processing apparatus according to the present embodiment. The reference numeral 997 denotes a display that displays a command input from the instruction input device 996, an output in response thereto from the video processing apparatus, or the like.

The reference numeral 999 denotes a system bus that controls the flow of data in the video processing apparatus. The reference numeral 998 denotes an interface (hereinafter referred to as the "I/F"), through which data is exchanged with an external apparatus.

Note that, as an alternative to the hardware devices, the configuration may be implemented by using software that provides equivalent functions to those of the devices described above. Operations as described below are implemented by the CPU 990 executing programs stored in a computer-readable storage medium such as the ROM 991.

Functional Configuration of Video Processing Apparatus

In the configuration of the present embodiment, object areas are acquired from an image to be processed, the distribution of the object areas is analyzed, and a cropping scheme for cropping partial images from the image to be processed is determined based on the distribution. This allows a virtual camera operation to be implemented properly to match the nature of an image.

Figure 1:
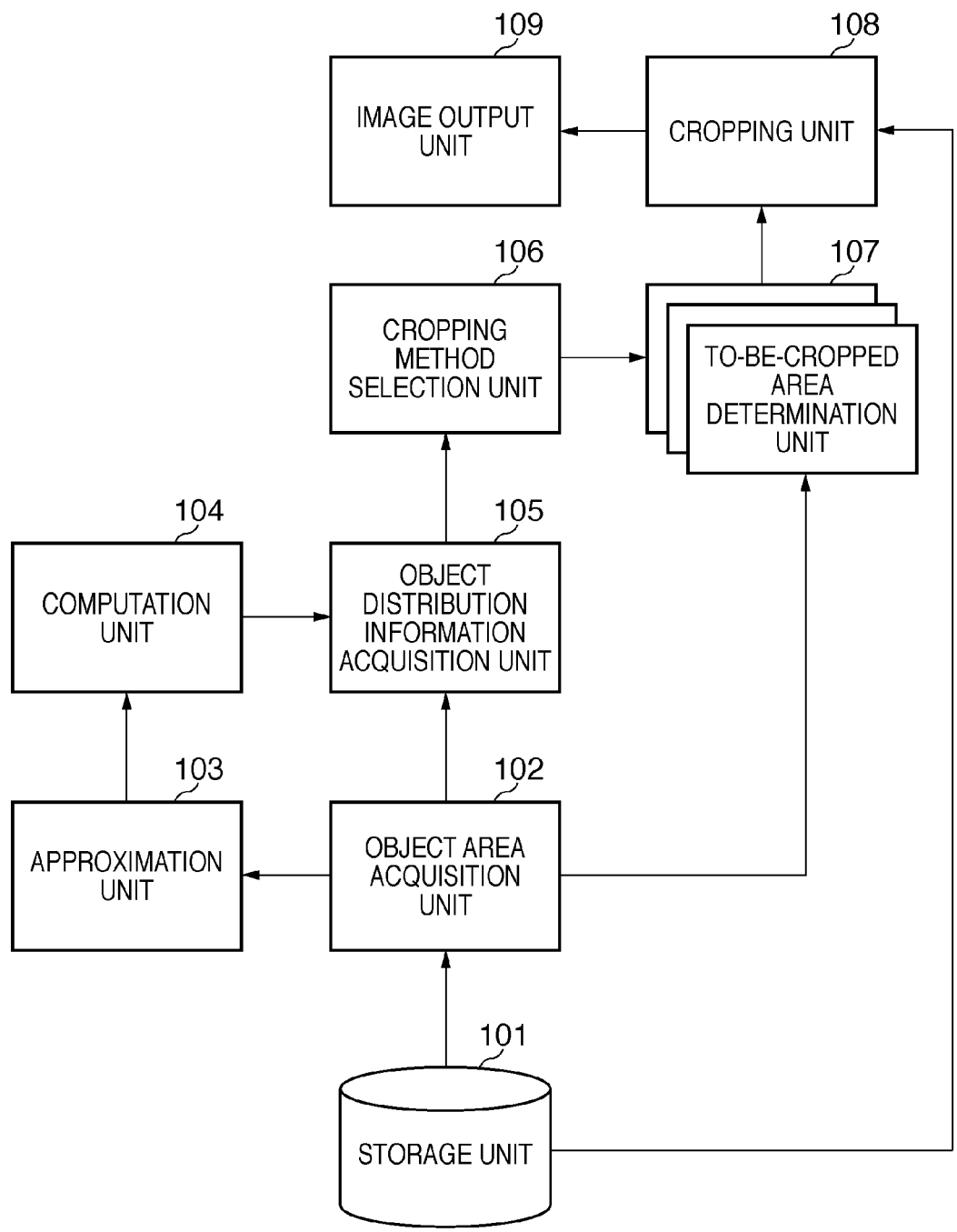
FIG. 1 is a block diagram illustrating an example of a functional configuration of a video processing apparatus.

FIG. 1 illustrates an example of a functional configuration of the video processing apparatus according to the present embodiment. In FIG. 1, the reference numeral 101 denotes a storage unit that accumulates images (image data) to be processed that include objects. In the present embodiment, while, as a matter of convenience, the storage unit is included in the functional configuration of the video processing apparatus and a readout operation is performed by reading image data from the storage unit, image data stored in another apparatus such as a file server may be acquired through a communication line.

The reference numeral 102 denotes an object area acquisition unit that acquires object areas for objects in an image, for example, the locations and sizes of objects. Objects as referred to herein include, for example, people's faces and automobiles, and in general, the locations and sizes of objects in an image may be analyzed by, for example, a module such as a face detection module or an object detection module. In the present embodiment, the locations and sizes of objects are analyzed and acquired through a series of processes. However, the method for acquiring the locations and sizes of objects is not limited thereto, and for example, they may be acquired by reading out pre-generated meta information.

The reference numeral 105 denotes an object distribution information acquisition unit that analyzes the distribution of object areas from the locations and sizes of all objects existing in an image and acquires object distribution information. The distribution information is, for example, typified by the result obtained by dividing an image into lattice-like pieces and calculating the degree of variances in objects (the amplitude of variations) depending on whether or not each area includes an object. As described later, in the present embodiment, the distribution information is given by a statistic that indicates the distribution of distances between a straight line that approximates the distribution of objects areas and the object areas. However, the distribution information may also be information that manages the locations and sizes of all objects in an image for later processing as described below.

In the present embodiment, functional components 103 to 106 are used to determine a cropping scheme (cropping method) for cropping partial images from an image to be processed, based on the distribution of object areas. It is thus possible to automatically select an appropriate cropping scheme that matches the distribution of object areas and perform the process of cropping partial images. Now, those functional components will be described.

The reference numeral 103 denotes an approximation unit that approximates the distribution of objects into a straight line, using the object distribution information. As a straight-line approximation method, for example, a least-square method is generally and widely known to be used for obtaining a straight line. Furthermore, it is also effective to apply the least-square method to obtain a straight line by weighted average that also takes the sizes of objects into consideration. Whatever the case may be, the straight-line approximation method is not limited to those described above.

The reference numeral 104 denotes a computation unit that computes the degree (magnitude) of variances in objects from deviations in the locations of the objects from the straight line. Examples of the method for obtaining the deviations include, for example, a method using the distances of isolation between the straight line and the centers of objects and a method using the area of each object that is closest to the straight line, and any method is acceptable. Examples of the method for obtaining the degree of variances include, for example, a method using the distance from the straight line to an object that is farthest from the straight line among all objects in an image and a method for obtaining a standard deviation using the distances between the straight line and all objects, and any method is acceptable.

Figure 4A:
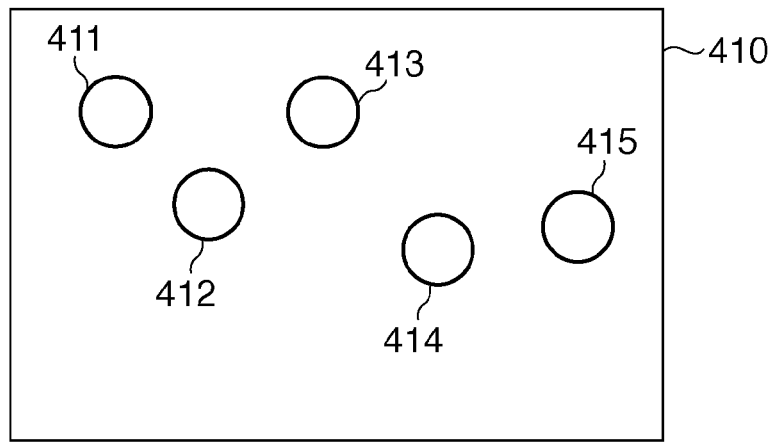
FIGS. 4A, 4B, and 4C are schematic diagrams illustrating an example of the process of analyzing the degree of variances in objects.
Figure 4B:
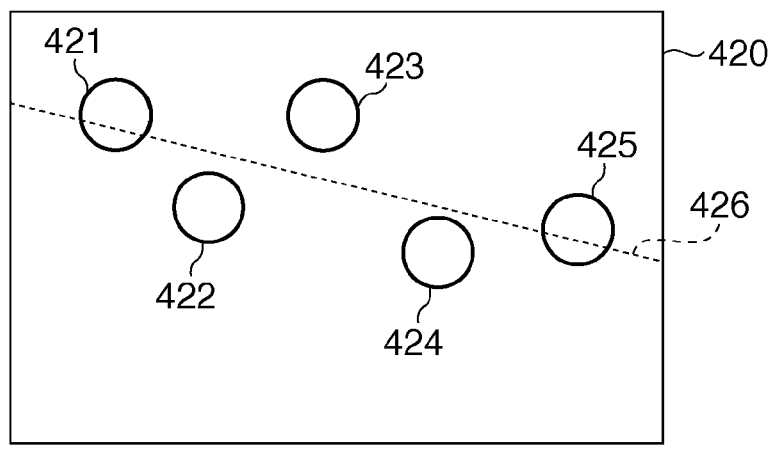
Figure 4C:
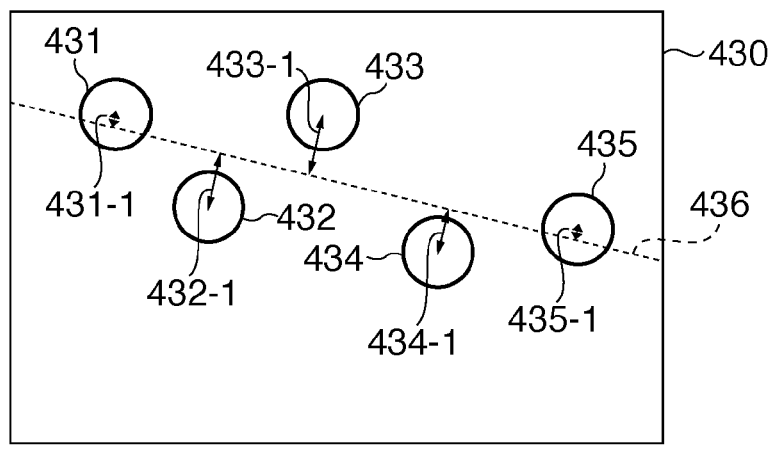

FIGS. 4A, 4B, and 4C are schematic diagrams illustrating the relationship of the elements that have been described above, namely objects in an image, a straight line that approximates the distribution of the objects, and the distances between the straight line and the objects. The reference numerals 410 (FIG. 4A), 420 (FIG. 4B), and 430 (FIG. 4C) denote the same image that is separately illustrated as a matter of convenience for making the above relationship clear. The reference numerals 411 to 415, 421 to 425, and 431 to 435 denote objects in the respective images, and objects having the same last digit are the same object. As can be seen from the drawing, there are five objects in the image. Dashed straight lines 426 and 436 in the images 420 and 430 are the straight lines that approximates the distribution of the objects using the least-square method, and cannot be viewed on the display of the image. Bidirectional arrows 431-1 to 435-1 in the image 430 indicate the distances from the straight line to the centers of the objects, and these distance values are used to compute the degree (magnitude) of variances.

Return to the description of FIG. 1. The reference numeral 106 denotes a cropping method selection unit that selects a method for cropping areas according to the degree of variances in objects. For example, if the degree of variances in objects is small, such as the case of a digital photograph that captured the presentation of a chorus on a stage in which people's faces are aligned in a single or multiple rows, an area cropping method such as panning objects in sequence with a virtual camera is selected.

FIGS. 5A, 5B, 5C, 5D, 5E, 5F, 5G, 5H, 5I, and 5J are diagrams explaining a specific example of the above-described virtual camera operation. The reference numeral 500 (FIG. 5A) denotes the entire image, and the same image as 500 is also illustrated as 511 to 519 (FIGS. 5B to 5J) for explaining the virtual camera operation. The reference numerals 501 to 505 denote objects that exist in the images 500 and 511 to 519. A dashed straight line 506 indicates a straight line that approximates the distribution of the objects 501 to 505, the line being illustrated as a matter of convenience and not existing in image data. The reference numerals 501-1 to 505-1 denote the respective distances between the objects 501 to 505 and the straight line 506, for use in obtaining the degree of variances in objects. If the degree of variances is small, a cropping method such as displaying each of the objects 501 to 505 in close-up while panning is determined.

Return to the description of FIG. 1. The reference numeral 107 denotes a to-be-cropped area determination unit that determines multiple areas to be cropped, using the locations and sizes of objects and the cropping method selected by the cropping method selection unit 106. The area cropping method is used to determine the center points of multiple areas to be cropped. The locations and sizes of objects are used to determine areas to be cropped so that objects will fit within the areas to be cropped.

This is described in detail with reference to FIGS. 5A to 5J. A dashed straight line 507 in the image 511 (FIG. 5B) indicates a trail of center points of camera angles during a virtual camera operation of panning, in other words, a line obtained by connecting the center points of multiple areas to be cropped. Although not clearly specified, the dashed straight lines in the images 512 to 519 (FIGS. 5B to 5J) indicate the same line. This line may be equivalent to the straight line 506 that approximates the distribution, or may be another straight line obtained by weighting using the sizes of objects or the like.

The reference numerals 511-2 to 519-2 in the images 511 to 519 denote to-be-cropped areas. Among those, the to-be-cropped area 511-2 is assumed as a starting point of the virtual camera operation and is output as a first step. The starting point does not have to be determined by a specific method, but in the present embodiment, as a matter of convenience, an area that includes the leftmost object in an image is assumed as a starting point. Accordingly, areas to be cropped are determined in sequence from 511-2 to 519-2 along the dashed straight line 507.

It is desirable that the sizes of the areas to be cropped be set so that the areas to be cropped include objects when the objects and the center points of camera angles come closest to each other. Also, while displacements of the center points of the areas to be cropped vary according to the number of areas to be cropped, the number of areas to be cropped is determined by the period of time for implementing the virtual camera operation or by the output frame rate. Moreover, in the case where the panning speed varies nonlinearly so that the virtual camera operation is accelerated or decelerated, this also needs to be considered. Meanwhile, before the cropping of the to-be-cropped area assumed as the starting point of panning, multiple areas may be cropped with a virtual camera operation such as zooming in from a to-be-cropped area that includes all objects, and after the end point, multiple areas may be cropped in sequence with a virtual camera operation such as zooming out.

Return to the description of FIG. 1. The reference numeral 108 denotes a cropping unit that crops determined areas to be cropped from an image. The reference numeral 109 denotes an image output unit that outputs cropped areas on the display screen or as moving image data. The cropping unit 108 and the image output unit 109 do not have to succeed each other during a series of processes, and information about determined areas to be cropped may be stored as an intermediate file, and this intermediate file may be used for later processing. Moreover, it is apparent that the area cropping process and the area output process may be performed with another apparatus using the intermediate file, but as a matter of convenience, they are included in the functional configuration of the present embodiment.

Video Processing

Figure 2:
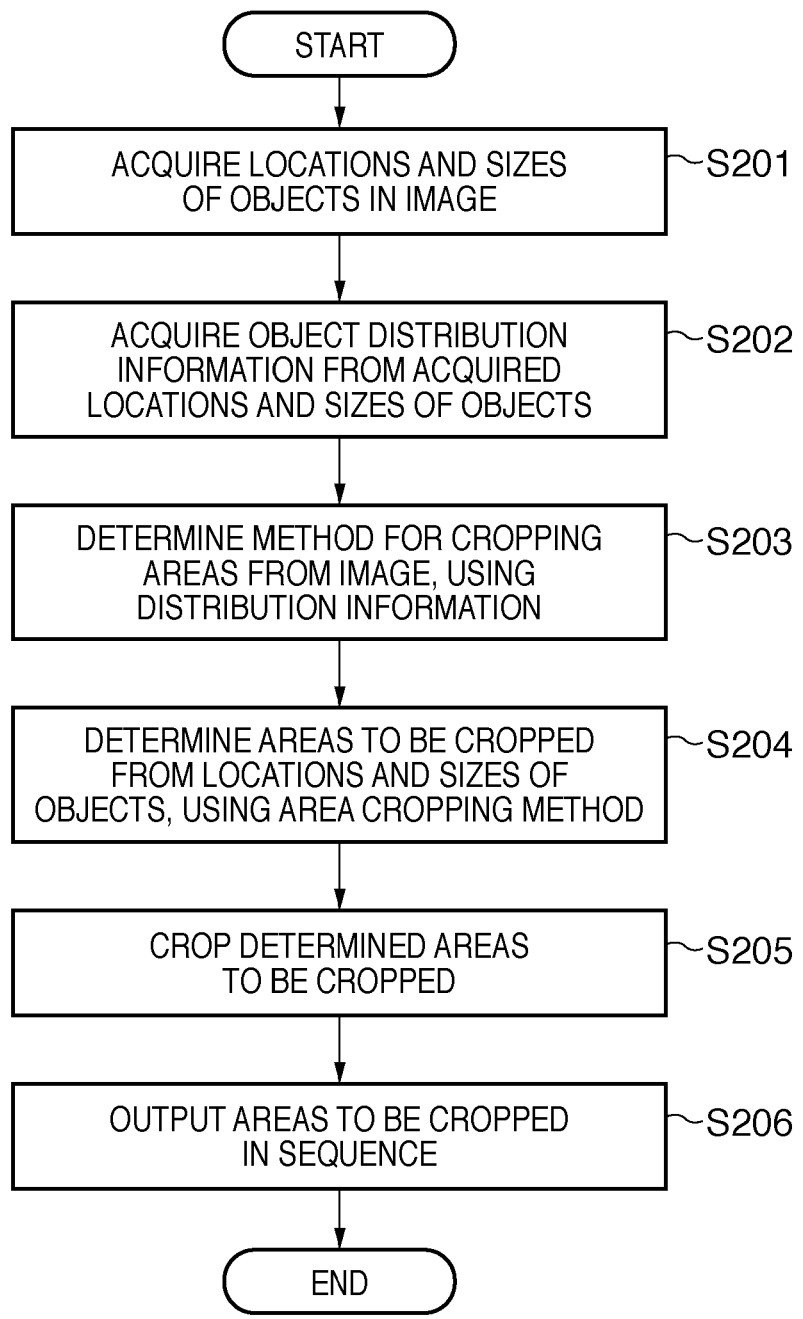
FIG. 2 is a process flowchart showing an example of a procedure performed by the video processing apparatus.

FIG. 2 is a flow chart showing an example of video processing from the start to the end, performed by the video processing apparatus according to the present embodiment. First, the locations and sizes of objects in an image are acquired (S201). As described above, the acquisition may be performed by object analysis or by reading out meta information about pre-analyzed locations and sizes. Then, object distribution information is acquired from the acquired locations and sizes of objects (S202). Then, a method for cropping multiple areas from an image is selected, using the acquired distribution information (S203). Then, areas to be cropped are determined from the locations and sizes of objects according to the selected area cropping method (S204). Then, the determined areas to be cropped are cropped in sequence (S205). Then, the cropped multiple areas are output in sequence (S206), and the process is completed.

Figure 3:
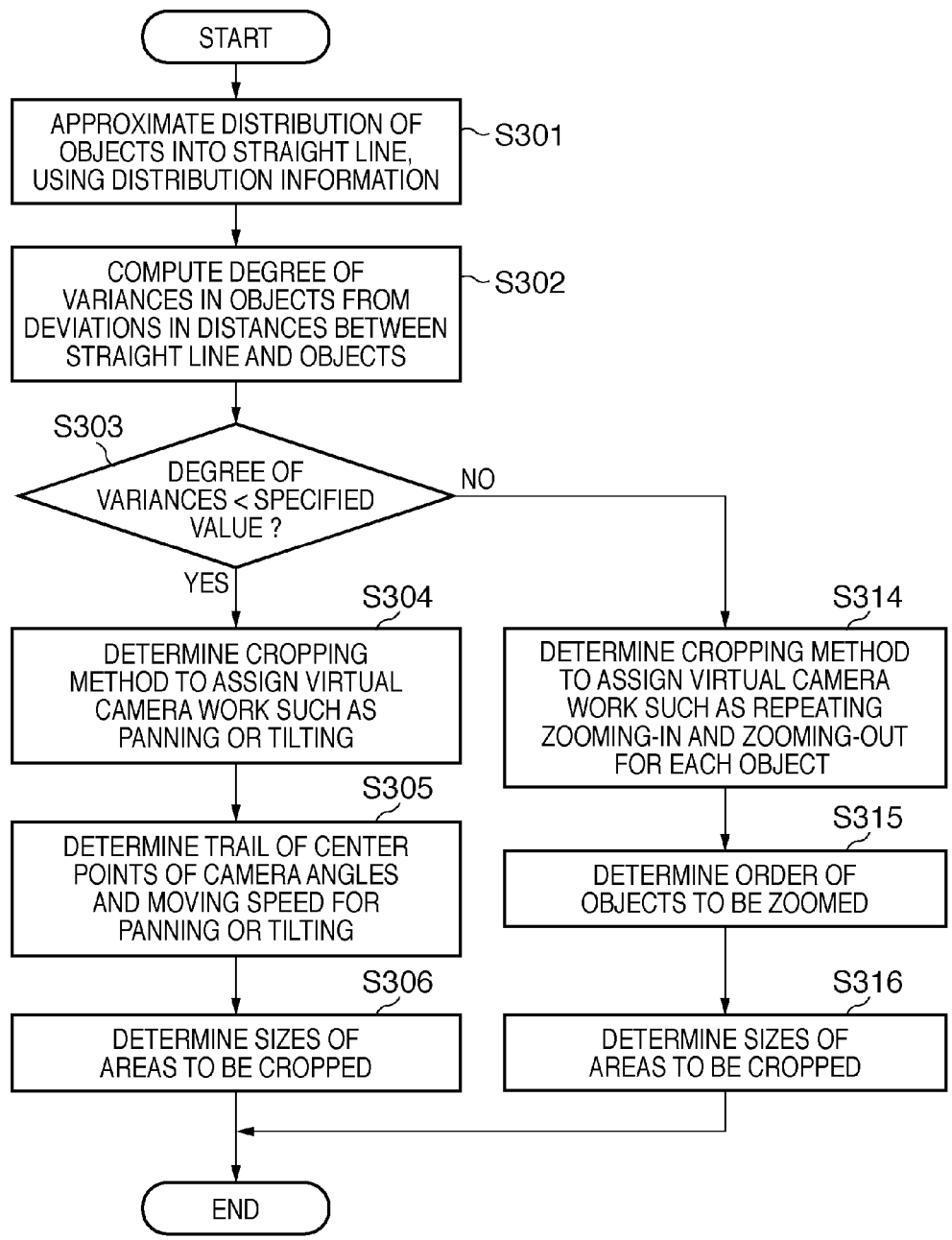
FIG. 3 is a process flowchart showing an example of a procedure performed by the video processing apparatus.

FIG. 3 is a process flowchart showing an example of a detailed process performed in S203 and S204 in FIG. 2. The process performed in S301 to S304 and S314 corresponds to S203, and the process performed in S305, S306, S315, and S316 corresponds to S204.

First, the distribution of objects is approximated into a straight line, using the distribution information (S301). Then, the degree of variances in objects (the magnitude of variations) is computed from the distances between the objects and the straight line that approximates the distribution of the objects (S302). The process branches according to whether or not the computed degree of variances is smaller than a specified value (predetermined value) (S303). If the degree of variances is smaller than the specified value (YES in S303), the process proceeds to S304, and if the degree of variances is equal to or larger than the specified value (NO in S303), the process proceeds to S314. In this way, in the present embodiment, a cropping scheme for cropping partial images is determined based on the magnitude of variations in the distribution of object areas, such a process being uncomplicated, so that the present embodiment is easy to implement.

In S304, a cropping method is selected so as to assign a virtual camera operation such as panning. Then, a trail of center points of camera angles and the moving speed for panning are determined (S305). Then, areas to be cropped are determined using the determined center points of camera angles and the locations and sizes of objects (S306). An example of cropping by a virtual camera operation such as panning has been described above with reference to FIGS. 5A to 5J. Then, the process in FIG. 3 is completed.

On the other hand, if the degree of variances is equal to or larger than the specified value, then in S314, a cropping method is determined so as to perform a virtual camera operation such as repeating zooming in to each object and zooming out to an area that includes all objects. In the present embodiment, such a cropping scheme is referred to as camera switching performed on each object. Then, the order of objects to be zoomed in to is determined (S315). Then, the sizes of the multiple areas to be cropped are determined (S316). And, the process in FIG. 3 is completed.

Example Operation 1 for Large Variance

Figure 6A:
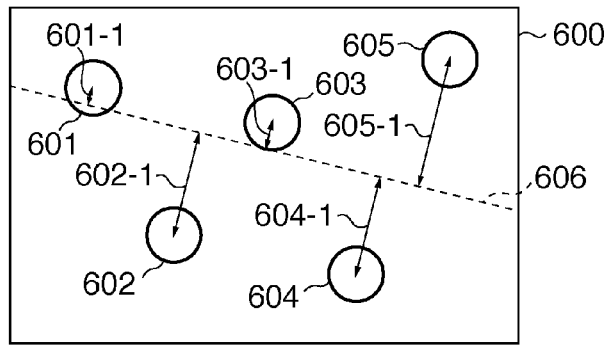
FIGS. 6A, 6B, 6C, 6D, 6E, 6F, 6G, 6H, 6I, 6J, 6K, 6L, 6M, 6N, 6O, and 6P are schematic diagrams illustrating an example of a virtual camera operation.
Figure 6B:
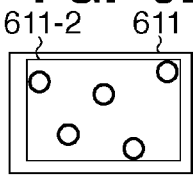
Figure 6C:
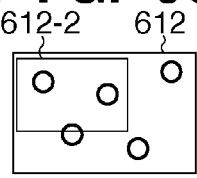
Figure 6D:
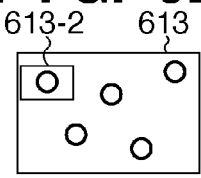
Figure 6E:
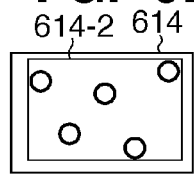
Figure 6F:
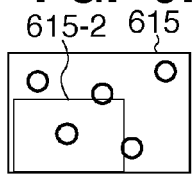
Figure 6G:
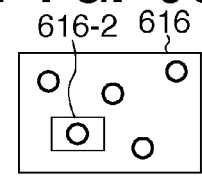
Figure 6H:
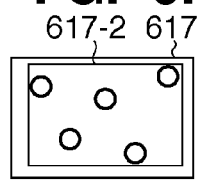
Figure 6I:
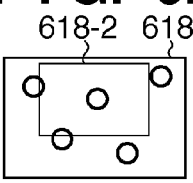
Figure 6J:
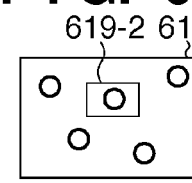
Figure 6K:
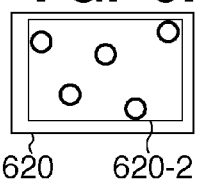
Figure 6L:
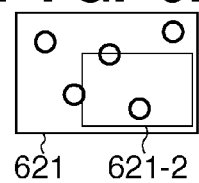
Figure 6M:
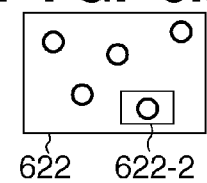
Figure 6N:
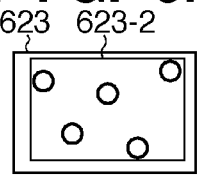
Figure 6O:
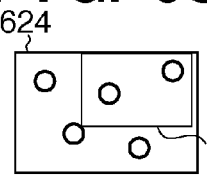
Figure 6P:
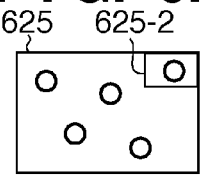

Areas to be cropped in the case where the degree (magnitude) of variances is small (in the case of panning) have already been described in "Functional Configuration of Video Processing Apparatus" with reference to FIGS. 5A to 5J. Similarly, areas to be cropped in the case where the degree of variances is larger than a specified value will be described for supplementation with reference to FIGS. 6A, 6B, 6C, 6D, 6E, 6F, 6G, 6H, 6I, 6J, 6K, 6L, 6M, 6N, 6O, and 6P. FIGS. 6A to 6P illustrate examples of areas to be cropped in the case where the degree of variances is larger than a specified value.

The reference numeral 600 (FIG. 6A) denotes the entire image area. The reference numerals 611 to 625 (FIGS. 6B to 6P) denote the same entire image area as 600 that is illustrated by multiple images as a matter of convenience for explaining areas to be cropped. The reference numerals 601 to 605 denote objects existing in an image. A dashed straight line 606 in the image 600 is a straight line that approximates the distribution of objects, the line being illustrated as a matter of convenience and not existing in image data. The reference numerals 601-1 to 605-1 denote the distances between the objects 601 to 605 and the straight line 606 that approximates the distribution of the objects.

As illustrated in FIGS. 6A to 6P, in the case where deviations in the locations of the objects from the straight line that approximates the distribution of the objects are large and the degree (magnitude) of variances is large, a trail of camera angles with a virtual camera operation such as panning draws a complicated curve, which is inacceptable for viewing. Thus, a cropping method is determined so as to perform a virtual camera operation such as repeating camera switching on each object.

First, the order of objects for camera switching is determined. In the example illustrated in FIGS. 6A to 6P, camera switching is determined to be performed in sequence from the left-side object, but the present invention is not limited thereto. For example, camera switching may be performed in descending order of the size of the objects, in ascending order of the distances between the objects and the center of the image, or in order of sharpness of the objects, for example. The reference numerals 611-2 to 625-2 denote to-be-cropped areas that are cropped and output in numerical order. The to-be-cropped areas 611-2 to 613-2 schematically illustrate the case where camera switching is performed on the leftmost object 601. Similarly, the to-be-cropped areas 614-2 to 616-2 illustrate the case for the second object from the left, the to-be-cropped areas 617-2 to 619-2 illustrate the case for the third object from the left, the to-be-cropped areas 620-2 to 622-2 illustrate the case for the fourth object from the left, and the to-be-cropped areas 623-2 to 625-2 illustrate the case for the fifth object from the left, in other words, the rightmost object 605. While for simplification of the drawings, only the to-be-cropped areas at the time of camera switching are illustrated, other multiple areas may be cropped by for example zooming out between the to-be-cropped areas 613-2 and 614-2.

Example Operation 2 for Large Variance

A supplementary description is given for another cropping method in the case where the degree of variances in objects is large as has been described with reference to FIGS. 3 and 6A to 6P. FIGS. 7A, 7B, 7C, 7D, 7E, 7F, 7G, 7H, 7I, 7J, 7K, 7L, 7M, 7N, 7O, and 7P illustrate an example of areas to be cropped in the case where the degree of variances is larger than a specified value.

The reference numeral 700 (FIG. 7A) denotes the entire image area, like 600 in FIG. 6A. The reference numerals 701 to 706 and 701-1 to 705-1 in the image area 700 are similar to 601 to 606 and 601-1 to 605-1 respectively in the image area 600 in FIG. 6A. As illustrated, in the case where the degree of variance of objects is large, a cropping method may be selected so that each of the objects is output in close-up. For example, the to-be-cropped areas 711-2 to 713-2 illustrate the case where the same area is cropped multiple times so that the leftmost object 701 is output in close-up for a predetermined period of time. Similarly, the same area around each object is cropped multiple times, the to-be-cropped areas 714-2 to 716-2 illustrating the case for the second object from the left, the to-be-cropped areas 717-2 to 719-2 illustrating the case for the third object from the left, the to-be-cropped areas 720-2 to 722-2 illustrating the case for the fourth object from the left, and the to-be-cropped areas 723-2 to 725-2 illustrating the case for the fifth object from the left, in other words, the rightmost object 705.

The above-described configuration enables automatic generation of video that is easier to view and engage a viewer when he or she views still images like a slide show.

Second Embodiment

Figure 8:
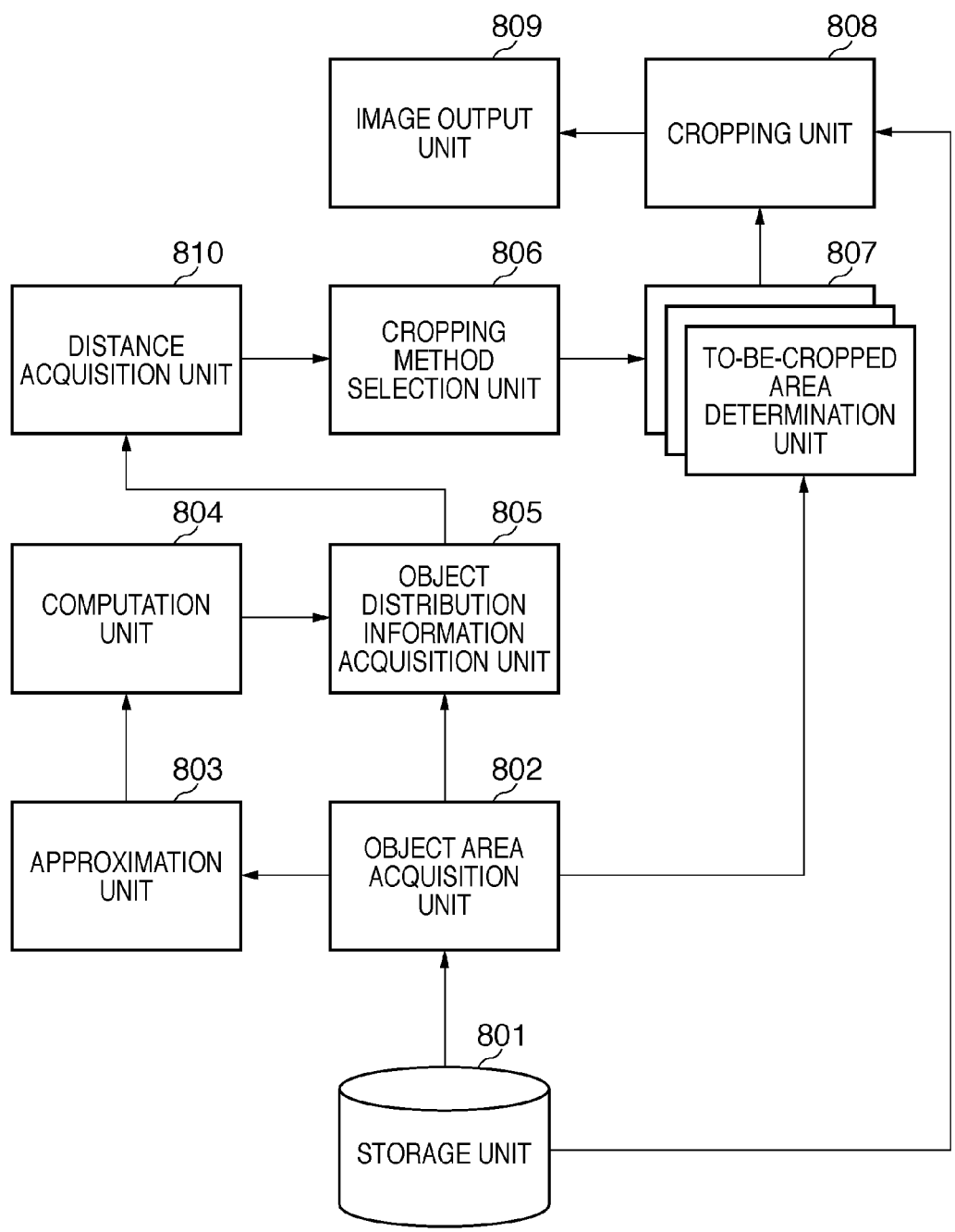
FIG. 8 is a block diagram illustrating a functional configuration of another video processing apparatus.

A second embodiment according to the present invention will be described below with reference to the drawings. Note that the parts that are similar to those described in the above first embodiment (for example, the hardware configuration of the video processing apparatus) will not be described herein. FIG. 8 illustrates an example of a functional configuration of a video processing apparatus according to the second embodiment of the present invention.

In the present embodiment, the distances between multiple objects are further analyzed. Then, even though the magnitude of variations in object areas are smaller than a specified value, if the distances between the objects are equal to or larger than a specified value, a cropping scheme for zooming in to each object included in an image is determined. For this, in the present embodiment, a distance acquisition unit 810 that acquires the distances between objects is provided at a later stage of the computation unit 104 (804 in FIG. 8) as illustrated in FIG. 8. Note that the computation unit 804 is, as described above, a functional component that computes the degree (magnitude) of variances from the distances between the straight line that approximates the distribution of objects and the locations of the objects. The effect brought by the additional functional configuration of the present embodiment will be described in detail with reference to the drawing. Note that functional components 801 to 809 are similar to 101 to 109 respectively described in the first embodiment, so the description thereof will be omitted herein.

FIGS. 9A, 9B, 9C, 9D, 9E, 9F, 9G, 9H, and 9I illustrate an example of areas to be cropped in the case where the degree of variances is smaller than a specified value and the distances between objects are larger than a specified value. The reference numeral 900 (FIG. 9A) denotes the entire image area. The reference numerals 901 and 902 denote objects existing in the image area 900. The reference numeral 906 denotes a straight line that approximates the distribution of the objects, and it is apparent that the degree of variances is small. The reference numeral 908 denotes the distance between the objects 901 and 902.

In the first embodiment, if the degree (magnitude) of variances is small, a cropping method that performs a virtual camera operation such as panning is determined. However, in the case of the distance 908 between the objects being large, such a virtual camera operation as panning may result in cropping and outputting an area that includes no object. Thus, in such a case, a cropping method that performs a virtual camera operation such as zooming in to each of the objects in sequence is determined, which reduces viewer discomfort.

Figure 7A:
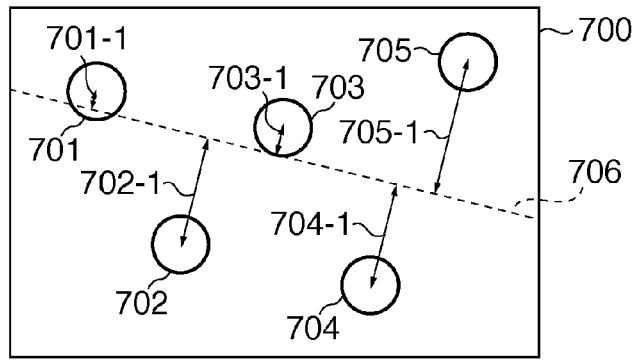
FIGS. 7A, 7B, 7C, 7D, 7E, 7F, 7G, 7H, 7I, 7J, 7K, 7L, 7M, 7N, 7O, and 7P are schematic diagrams illustrating an example of a virtual camera operation.
Figure 7B:
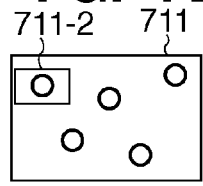
Figure 7C:
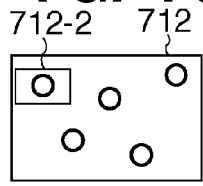
Figure 7D:
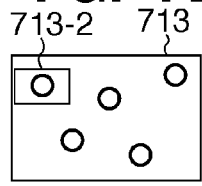
Figure 7E:
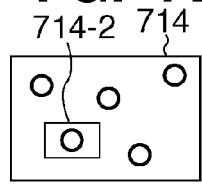
Figure 7F:
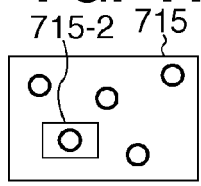
Figure 7G:
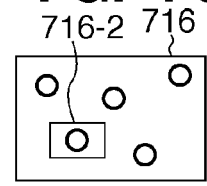
Figure 7H:
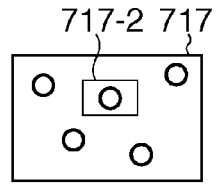
Figure 7I:
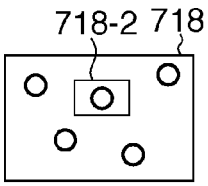
Figure 7J:
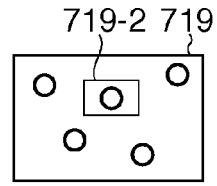
Figure 7K:
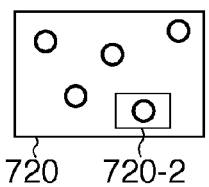
Figure 7L:
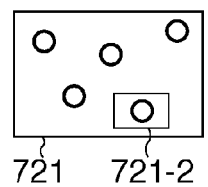
Figure 7M:
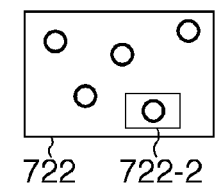
Figure 7N:
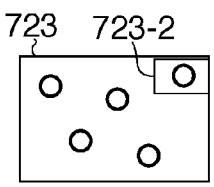
Figure 7O:
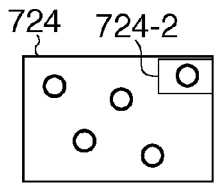
Figure 7P:
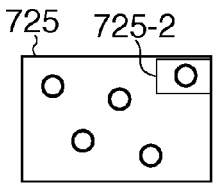

In FIGS. 9B to 9I, the reference numerals 911 to 918 denote the same image area as 900, and the reference numerals 911-2 to 918-2 denote multiple areas to be cropped. As an alternative, it is of course possible to select a cropping method so as to output each object in close-up as illustrated in FIGS. 7A to 7P in the first embodiment.

Figure 10:
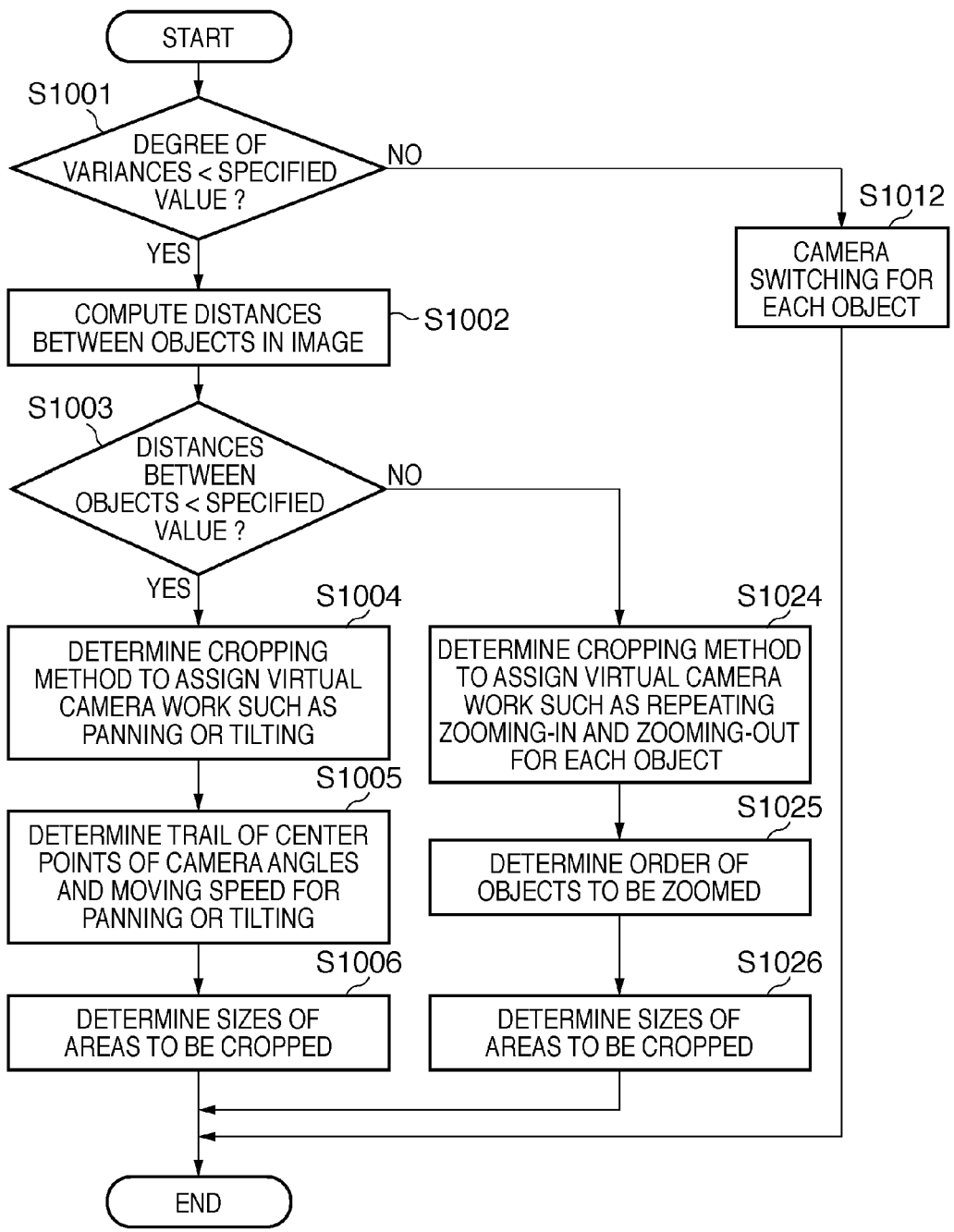
FIG. 10 is a process flowchart showing an example of a procedure performed by the video processing apparatus.

FIG. 10 is a process flowchart showing an example of a detailed process performed in S203 and S204 in FIG. 2 according to the present embodiment. First, it is determined whether or not the degree (magnitude) of variances that have been computed as described in the first embodiment is smaller than a specified value (S1001). If the degree of variances is smaller than the specified value (YES in S1001), the process proceeds to S1002, and if the degree of variances is equal to or larger than the specified value (NO in S1001), the process proceeds to S1012.

In S1012, the process of performing camera switching on each object is performed, which has already been described in the first embodiment. The process performed in S1012 corresponds to the process performed in S314 to S316 in FIG. 3 and is similar to the processes as described in "Example Operations 1 and 2 for Large Variance" in the first embodiment. After S1012 has finished, the process is completed.

Meanwhile, in S1002, the distance between objects is computed. Note that, in the present embodiment, the distance between the objects is analyzed along the above-described approximate straight line. In the case where there are three or more objects in the entire image area, an average value of the distances between adjacent objects along the approximate straight line may be computed, for example. Then, it is determined in S1003 whether or not the distance between the objects is smaller than a specified value.

Here, the process branches depending on the distance between the objects (S1003). The process in the case where the distance between the objects is smaller than the specified value has already been described in the first embodiment (S1003 to S1006). In the case where the distance between the objects is larger, a cropping method is selected so as to perform a virtual camera operation such as repeating zooming in to each of the objects and zooming out to an area that includes all objects (S1024). Then, the order of objects to be zoomed in to is determined (S1025). While, as a matter of convenience, FIGS. 9A to 9I illustrate an example of zooming in sequence from the left-side object, the method for determining that order is not specifically limited. Then, the sizes of the multiple areas to be cropped are determined in sequence.

The above-described configuration enables automatic generation of video that causes a viewer no discomfort when he or she views still images like a slide show.

Third Embodiment

A third embodiment according to the present invention will be described below with reference to the drawings. In the present embodiment, an image to be processed is a moving image that includes multiple frames, so the configuration for performing the process of cropping areas from frame images that constitute a moving image will be described. Note that the parts that are similar to those in the above-described first and second embodiments (for example, the hardware configuration of the video processing apparatus) will not be described herein.

Functional Configuration of Video Processing Apparatus

FIG. 11 illustrates an example of a functional configuration of a video processing apparatus according to the third embodiment of the present invention. FIG. 11 differs from FIG. 1, which has been referred to in the first embodiment, in that an extraction unit 1110 that extracts a frame image from a moving image and a computation unit 1111 that calculates a difference in the locations and sizes of objects between frames are additionally provided. In the present embodiment, the magnitude of the displacements of object areas between frames is calculated, and a cropping scheme for cropping partial images from the frames is determined based on the distribution of the object areas and the magnitude of the displacements. This allows partial images that include objects to be cropped appropriately from a moving image and thus allows the implementation of a high-quality virtual camera operation. Functional components 1101 to 1109 are similar to 101 to 109 in FIG. 1, respectively, which have already been described in the first embodiment, so the description thereof will be omitted herein.

Video Processing

Figure 12:
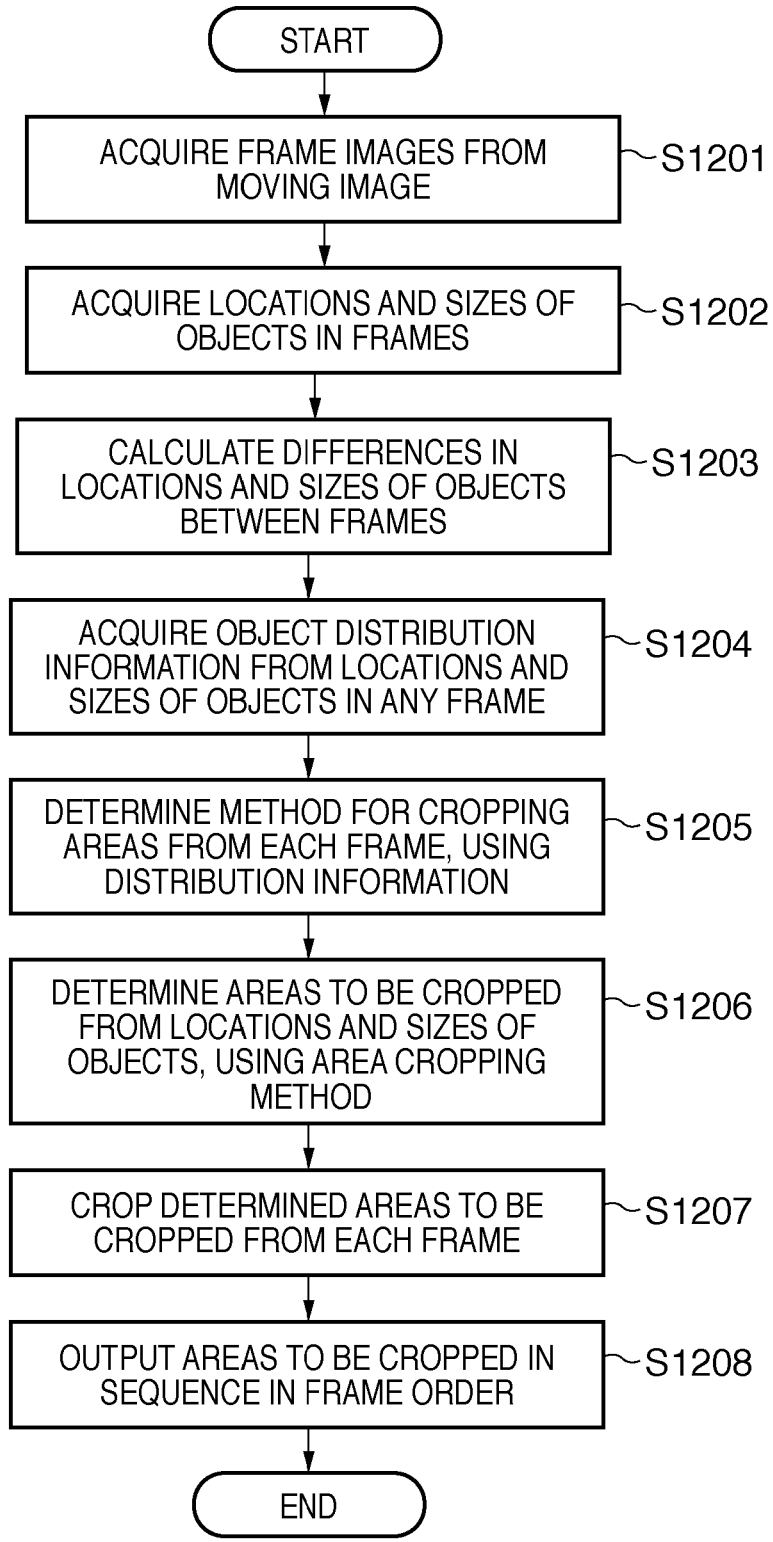
FIG. 12 is a process flowchart showing an example of a procedure performed by the video processing apparatus.

FIG. 12 is a process flowchart showing an example of video processing according to the present embodiment. First, multiple frame images are acquired from moving image data (S1201), and the locations and sizes of objects are acquired from each of the acquired frames (S1202). Then, differences in the locations and sizes of objects between the frames are calculated (S1203), and object distribution information is acquired from the locations and sizes of objects in any one of the frames (S1204). Here, a specific procedure for acquiring the distribution information has already been described in the first embodiment, so it will not be described herein. Also, instead of using any one of the frames, multiple frames may be used to calculate averages of the locations and sizes of objects, for example.

Then, a method for cropping areas from each of the frames is selected, using the acquired distribution information (S1205). The method for the determination has already been described in the first and second embodiments, so it will not be described herein. Then, areas to be cropped from each of the frames are determined, using the determined area cropping method and the locations and sizes of the objects (S1206). As a last step, the determined areas to be cropped are cropped from each of the frames (S1207), and the cropped areas are output in sequence in frame order (S1208).

In the case of a moving image, objects generally make movements, so the cropping scheme needs to be determined using a different procedure from that in the case of a still image. Now, a procedure for selecting such a cropping method (cropping-method selection process) will be described.

Cropping-Method Selection Process

Figure 13:
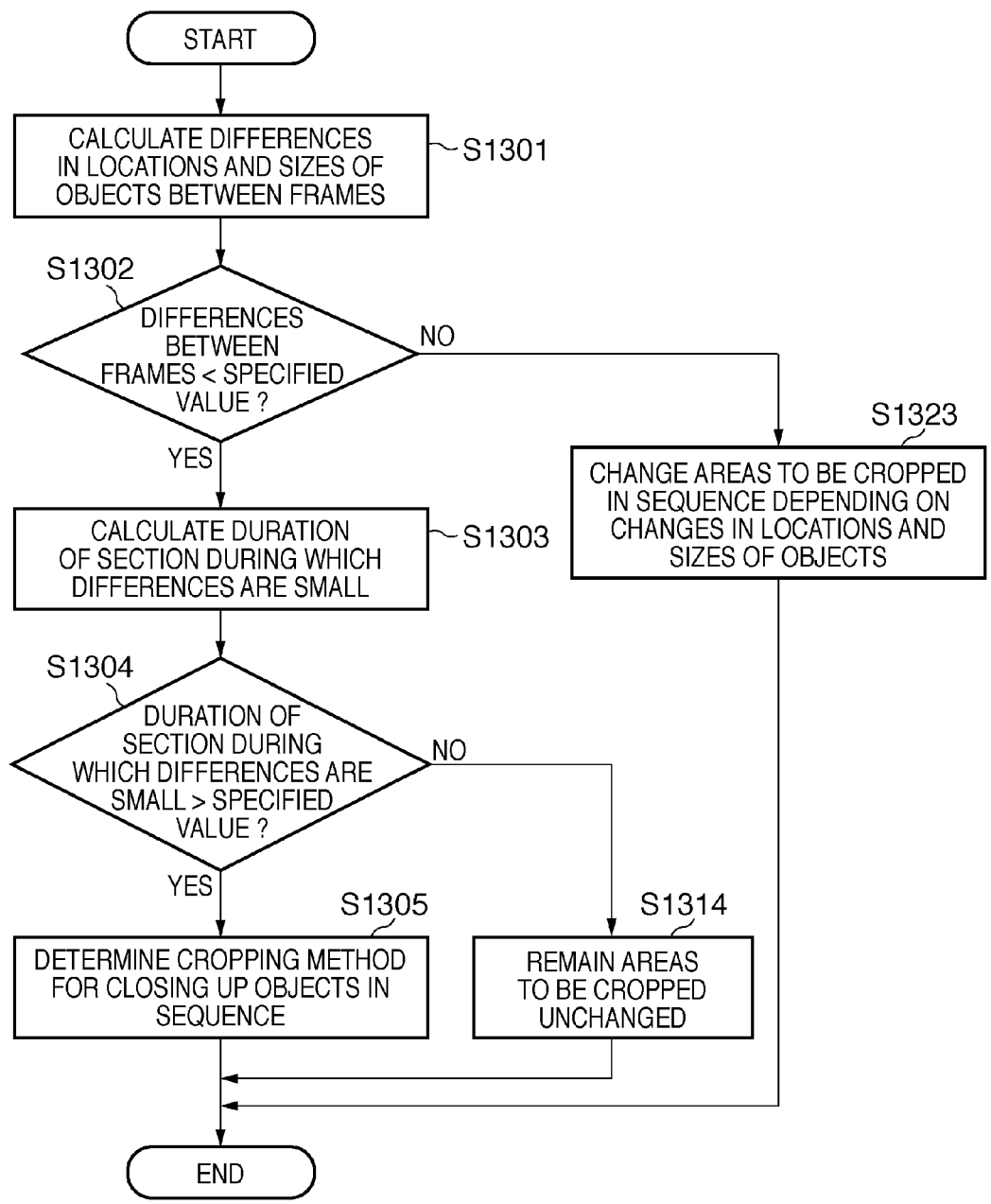
FIG. 13 is a process flowchart showing an example of a procedure performed by the video processing apparatus.

FIG. 13 is a process flowchart showing an example of the process of selecting an area cropping method. First, as described with FIG. 12, differences in the locations and sizes of objects between frames are calculated (S1301), and the process branches depending on whether or not the differences are smaller than a specified value (S1302).

If the differences are not smaller than the specified value (NO in S1302), in other words, if the objects make large movements, it is determined that a cropping method is sequentially changed according to displacements of the object areas, for example, displacements of the locations and sizes of the objects (S1323). For example in a section of a moving image in which objects as a whole are shifting right, a cropping method that assigns a virtual camera operation of panning in the right direction is determined. Or, in the case where some objects are shifting right and move out of frame from areas to be cropped, a cropping method that assigns a virtual camera operation of zooming out so as to include all objects in a frame is determined. Moreover, in the case where objects as a whole are assembled into any given area, a cropping method that assigns a virtual camera operation of zooming in so as to include all objects in a frame is determined. While some examples have been described herein, the present invention is not limited thereto.

Next described is the case where the differences between frames are smaller than the specified value (YES in S1302). First, the duration time of a moving-image section in which the differences are small is calculated (S1303), and the process branches depending on whether or not the duration is more than a specified value (a specified period of time) (S1304). If the duration is not longer than the specified period of time (NO in S1304), in other words, if the objects will move soon, the process proceeds to S1314.

In S1314, a cropping method is determined so as to crop areas to be cropped without change as a preparation to the above-described subsequent change in the cropping method in S1323, in other words, to crop partial images from fixed areas in multiple frames. Here, it is also possible to determine a cropping method so as to change areas to be cropped in advance in view of the directions in which the objects will move or as a preparation to the subsequent cropping method that will be selected after object movements.

Meanwhile, if the duration is more than the specified value (YES in S1304), that is, if the objects remain stationary for a certain period of time or more, the process proceeds to S1305. In S1305, the method that has been described above in the first and second embodiments, in other words, a cropping scheme that implements a virtual camera operation of sequentially closing up each of the objects included in an image to be processed, is determined. Here, it is desirable that the virtual camera operation be completed within the above calculated duration, as a preparation for the subsequent virtual camera operation.

With the above-described configuration, the present invention is also applicable to virtual camera operations for a moving image, and it is possible to automatically generate video that is easy to view and engaging a viewer.

In the configurations of the above-described embodiments, for the editing of assigning a virtual camera operation by cropping area spaces in video, it is possible to automatically assign a virtual camera operation that provides video display that always engages a viewer.

The present invention provides a technique for cropping partial images from video to be processed and implementing an appropriate virtual camera operation that matches the nature of the video.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117045, filed on May 13, 2009, which is hereby incorporated by reference herein in its entirety.

What is claimed is:

1. An image processing apparatus for cropping and outputting a plurality of partial images from an image to be processed, comprising:
    an acquisition unit adapted to acquire a plurality of object areas for a plurality of objects included in the image to be processed;
    an analysis unit adapted to analyze a magnitude of variations in a distribution of the plurality of acquired object areas;
    a determination unit adapted to determine a cropping scheme for cropping partial images from the image to be processed, based on the magnitude of variations; and
    a cropping unit adapted to crop the partial images from the image to be processed, using the determined cropping scheme,
    wherein the magnitude of variations is computed from a relationship between objects and a straight line that approximates the distribution of the objects.

2. The image processing apparatus according to claim 1, wherein the determination unit determines a different cropping scheme depending on whether or not the magnitude of variations is smaller than a predetermined value.

3. The image processing apparatus according to claim 2, wherein, if the magnitude of variations is smaller than the predetermined value, the determination unit determines a cropping scheme for sequentially panning the objects included in the image to be processed.

4. The image processing apparatus according to claim 2, wherein, if the magnitude of variations is equal to or greater than the predetermined value, the determination unit determines a cropping scheme for performing camera switching on each of the objects included in the image to be processed.

5. The image processing apparatus according to claim 2, wherein
the analysis unit further analyzes distances between the objects, and
if the distances between the objects are equal to or greater than a specified value even though the magnitude of variations is smaller than the predetermined value, the determination unit determines a cropping scheme for performing camera switching on each of the objects included in the image to be processed.

6. The image processing apparatus according to claim 2, wherein the analysis unit approximates the distribution of the object areas into a straight line and analyzes a statistic that indicates a distribution of distances between the straight line and the object areas, as the magnitude of variations.

7. The image processing apparatus according to claim 5, wherein the analysis unit approximates the distribution of the object areas into the straight line and analyzes the distances between the objects along the straight line.

8. The image processing apparatus according to claim 1, in which the image to be processed is a moving image including a plurality of frames, further comprising:
an arithmetic unit adapted to calculate magnitude of displacements of the object areas between the frames,
wherein the determination unit determines a cropping scheme for cropping the partial images from the frames, based on the distribution and the magnitude of the displacements.

9. The image processing apparatus according to claim 8, wherein, if the magnitude of the displacements is equal to or greater than a predetermined value, the determination unit determines a cropping scheme for changing area to be cropped in the partial images depending on displacements of the object areas.

10. The image processing apparatus according to claim 9, wherein, if the magnitude of the displacements is smaller than the predetermined value and if a period of time during which the magnitude of the displacements is smaller than the predetermined value is longer than a specified period of time, the determination unit determines a cropping scheme for sequentially closing up the objects included in the image to be processed.

11. The image processing apparatus according to claim 9, wherein if the magnitude of the displacements is smaller than the predetermined value and if a period of time during which the magnitude of the displacements is smaller than the predetermined value is equal to or shorter than a specified period of time, the determination unit determines a cropping scheme for cropping the partial images from each fixed area in the frames.

12. A method for controlling an image processing apparatus that crops and outputs a plurality of partial images from an image to be processed, the method comprising:
an acquisition step of acquiring a plurality of object areas for a plurality of objects included in the image to be processed;
an analysis step of analyzing a magnitude of variations in a distribution of the plurality of acquired object areas;
a determination step of determining a cropping scheme for cropping the partial images from the image to be processed, based on the magnitude of variations; and
a cropping step of cropping the partial images from the image to be processed, using the determined cropping scheme,
wherein the magnitude of variations is computed from a relationship between objects and the straight line that approximates the distribution of the objects.

* * * * *